United States Patent [19]

Boulton et al.

[11] Patent Number: 4,477,039

[45] Date of Patent: Oct. 16, 1984

[54] VENTED COWL VARIABLE GEOMETRY INLET FOR AIRCRAFT

[75] Inventors: Donald G. Boulton, Henry County, Tenn.; Gerald T. Arcangeli, St. Louis County, Mo.

[73] Assignee: McDonnell Douglas Corporation, St. Louis, Mo.

[21] Appl. No.: 393,648

[22] Filed: Jun. 30, 1982

[51] Int. Cl.³ .............................................. B64D 33/02
[52] U.S. Cl. .................. 244/53 B; 60/270.1; 60/269; 137/15.1
[58] Field of Search .................. 244/53 B, 53 R, 74, 244/55; 137/15.1, 15.2; 60/269, 270.1, 229

[56] References Cited

U.S. PATENT DOCUMENTS

| | | | |
|---|---|---|---|
| 2,970,431 | 7/1961 | Harshman | 60/35.6 |
| 2,995,892 | 8/1961 | Kosson et al. | 60/35.6 |
| 3,011,307 | 12/1961 | Edelfelt | 60/35.6 |
| 3,062,484 | 11/1962 | Himka | 244/53 B |
| 3,242,671 | 3/1966 | Moorehead | 244/15.1 |
| 3,524,458 | 8/1970 | Goldsmith | 137/15.1 |
| 3,535,882 | 10/1970 | Tizio et al. | 60/270.1 |

FOREIGN PATENT DOCUMENTS

| | | | |
|---|---|---|---|
| 167512 | 6/1959 | Sweden | 244/53 B |
| 614548 | 12/1948 | United Kingdom | 244/53 B |
| 870182 | 6/1961 | United Kingdom | 244/53 B |

Primary Examiner—Galen L. Barefoot
Attorney, Agent, or Firm—Gravely, Lieder & Woodruff

[57] ABSTRACT

A vented cowl variable geometry inlet for aircraft which provides means to permit starting an overly contracted inlet by dumping sufficient air to obtain the start, as well as to dump air when no thrust is required, but without loss of combustion, and to effect operation of an aircraft of piloted or missile character in a regime where reduction in fuel flow and thrust is advantageous.

7 Claims, 5 Drawing Figures

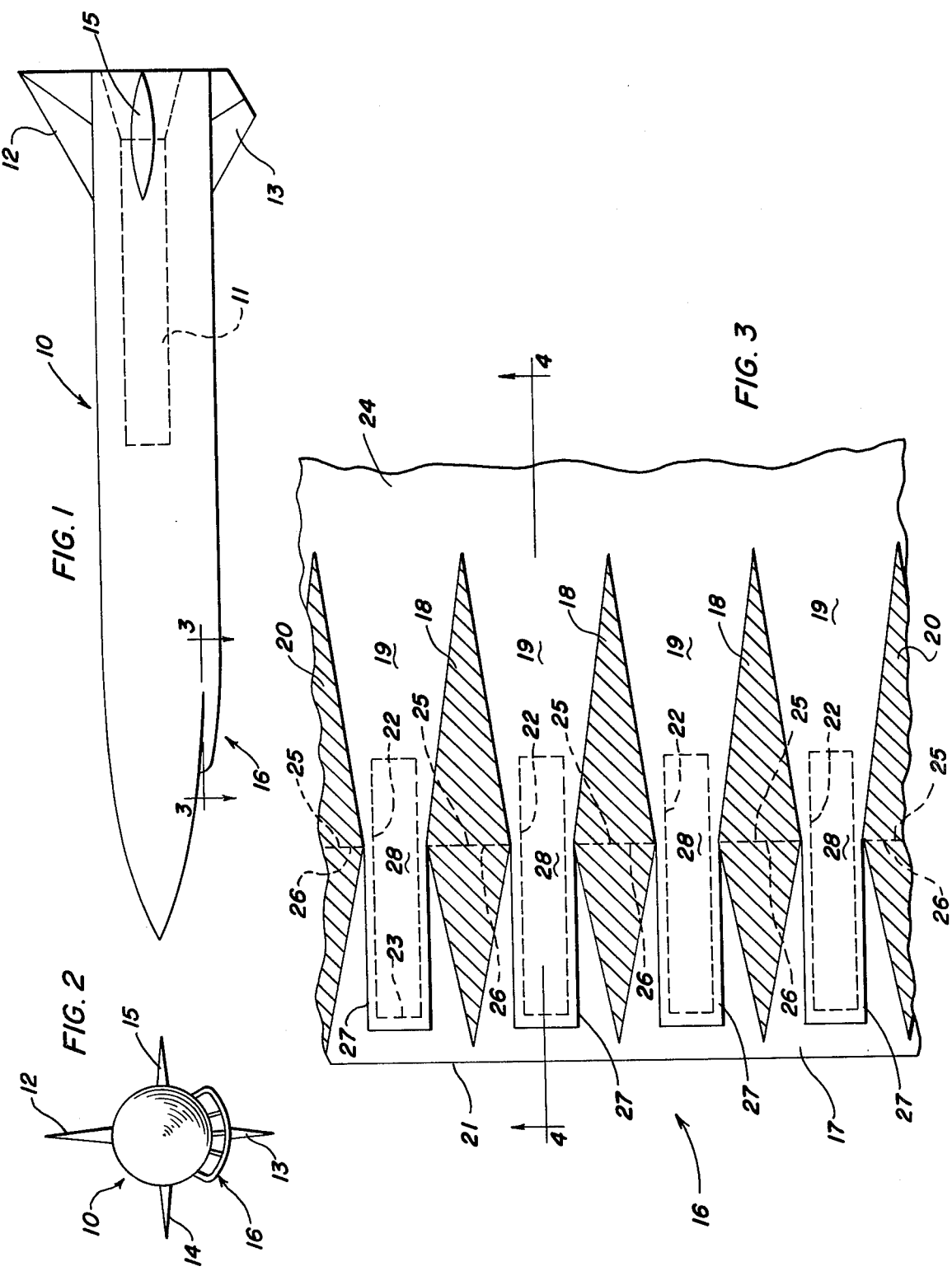

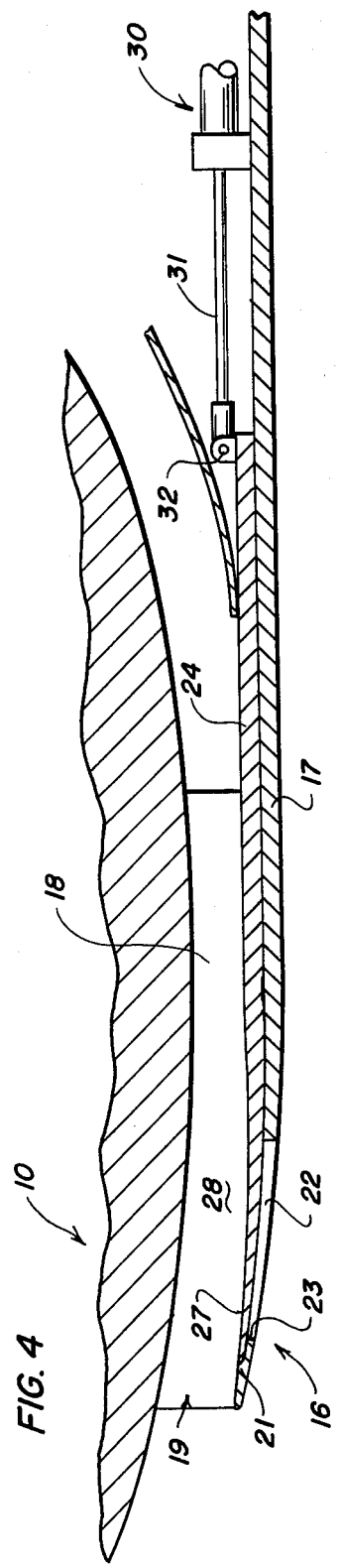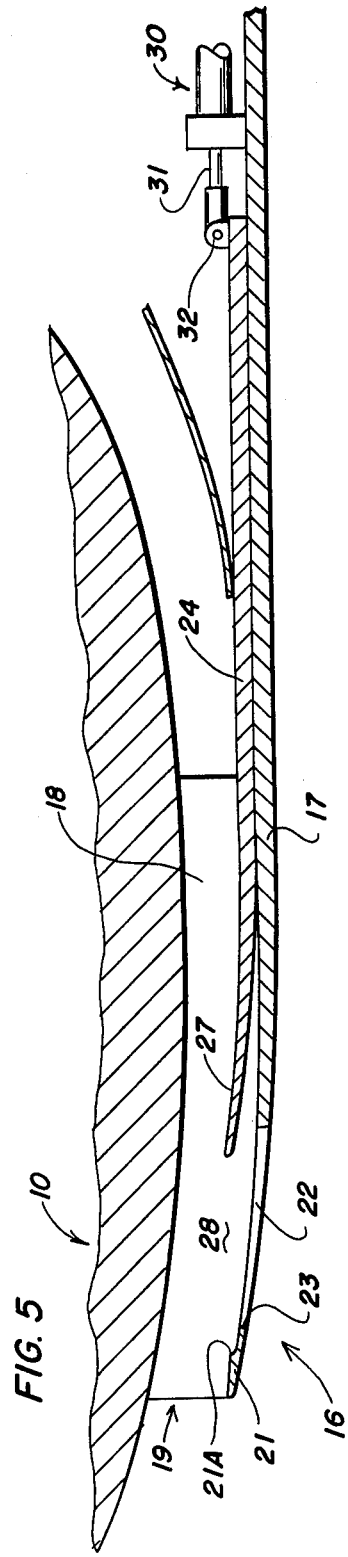

VENTED COWL VARIABLE GEOMETRY INLET FOR AIRCRAFT

BACKGROUND OF THE INVENTION

1. Field of the Invention

This invention pertains to a variable geometry inlet for supersonic aircraft or missiles which uses a vented cowl.

2. Description of the Prior Art

One example of a vented inlet for subsonic and supersonic aircraft is disclosed in Goldsmith U.S. Pat. No. 3,524,458 of Aug. 18, 1970 where a bluff wall is disposed to move across the inlet to deflect the boundary layer so a portion of the airflow will move through a bleed aperture to the exterior.

An example of a movable cowl for a variable throat is seen in Moorehead U.S. Pat. No. 3,242,671 of Mar. 29, 1966 for the purpose of varying the cross-sectional area of the inlet throat for an airbreathing engine of supersonic character to reduce drag and obtain maximum airflow.

The patent of Larson U.S. Pat. No. 3,208,383 of Sept. 28, 1965 discloses a ramjet vehicle with a system of vents used with a circumferential air inlet for obtaining aerodynamic control when attached to the booster.

It is generally known that the performance of an air inlet for a supersonic aircraft or missile is related to its air mass capture and compression characteristics. The optimum manner of operation of an air inlet must capture the correct amount of air, must remain started at all times, and provide the proper airflow contraction characteristic to achieve the highest total pressure for the engine. The performance is degraded if there is too little or too much air, and an unstarted inlet causes excessive pressure losses because of a shock ahead of the inlet, air spillage and cowl drag.

The problem with the prior art is that none has the ability to vary the inlet capture and its contraction to achieve the degree of variability necessary for optimum or near optimum inlet performance for many vehicle applications. Many fixed geometry inlets are intended to be unstarted at the low velocity conditions (below the velocity where a ramjet will predominately operate), which causes substantial performance losses, in order to have higher contraction and higher performance at the high velocity ramjet flight conditions. This trading of losses for gains can be circumvented by the vented cowl inlet arrangement, as will appear hereinafter. Another problem exists with starting inlets having the required internal contraction for high performance at a given Mach number in that such an inlet has excessive internal contraction for starting and will not self-start.

BRIEF SUMMARY OF THE INVENTION

The present invention is directed to overcoming the problem that excessively contracted inlets will not start if designed to achieve high performance at a given Mach number because of the internal contraction. The starting of such an inlet can be achieved by providing cowl vents which when opened will permit starting and when closed the inlet will remain started, due to the hysteresis effect in the starting cycle. Therefore, an object of the invention is to provide means to start an overly contracted inlet by dumping sufficient air and reducing the internal geometric contraction to obtain the start.

A further object of the present invention is to provide vent means in the air inlet cowl for dumping air when no thrust is required, but to accomplish this without loss of combustion.

Another object of the present invention is to provide means for operating an aircraft or missile in a regime wherein reduction in fuel flow and thrust is advantageous.

Still another object of this invention is to provide an inlet with variable geometry through selective opening of air inlet cowl vents.

BRIEF DESCRIPTION OF THE DRAWINGS

FIG. 1 is a longitudinal silhouette view of a representative aircraft body having a chin air inlet;

FIG. 2 is a front elevational view of the aircraft body of FIG. 1;

FIG. 3 is a fragmentary plan in developed view of the cowl struts, movable door and vent openings, the view being taken along line 3—3 in FIG. 1;

FIG. 4 is a fragmentary longitudinal sectional view on an enlarged scale of a typical air inlet passage adjacent a cowl strut to illustrate the cowl door in closed position over a vent, the view being taken at line 4—4 in FIG. 3; and FIG. 5 is a view similar to FIG. 4 showing the cowl door in open position for starting, or for reducing the airflow to reduce the thrust.

DETAILED DESCRIPTION OF THE EMBODIMENTS

There is shown in general silhouette form in FIGS. 1 and 2 an aircraft body 10 having propulsion means 11 in the aft section along with vertical guidance surfaces 12 and 13 and horizontal guidance surfaces 14 and 15. The onboard propulsion means may be of generally conventional type in which a combustion chamber receives fuel and air, with the air being received from an inlet shown at 16. The present embodiment is primarily concerned with the air inlet construction which possesses unique features which are shown in detail in other views of the drawings.

FIG. 3 shows in developed plan view the cowl structure 17 as seen from inside the air inlet passage. The developed view is necessary since the cowl 17 is actually curved as can be seen in FIG. 2 and a flat view is more easily understood. The cowl is supported by a plurality of struts 18 arranged in laterally spaced positions to define airflow inlet passages 19. The outer side struts 20 are approximately one-half the size of struts 18. All struts 18 and 20 extend from near the leading edge 21 of the cowl 17 rearwardly to a throat section 28 (see FIG. 3) of the air inlet passages 19. Each of the passages 19 has an air outlet opening 22 shown in dotted outline. Each opening 22 has its forward margin 23 spaced from the cowl leading edge 21.

The outlet openings 22 are controlled by door means in the form of a plate 24 having width substantially equal to the inside width of the cowl structure. The plate 24 reaches forward in a slot beneath the trailing ends of the struts 18 and 20 to a forward edge 25 (seen in broken line) which abut the notched surface 26 (also seen in broken line) under the respective struts where the door means is arrested in its forward stroke. The door means 24 is formed with projecting elements 27 of generally rectangular shape with a width and length to completely close the underlying outlet openings 22. As the door means 24 is moved back (rightwardly in FIG. 3) the elements 27 progressively uncover and open the outlet openings 22 so that air vents are created for a purpose to appear.

Turning now to FIGS. 4 and 5, there is shown a typical airflow passage 19 which is one of the plurality of such passages formed in the cowl 17 between any two laterally spaced struts 18 or 18 and 20. The cowl 17 has its leading edge 21 formed with a notch 21A, and as shown the cowl has an upwardly curved configuration to form with the body 10 an air inlet for the passage 19. The cowl 17 is given an aerodynamic curved shape, as well as to provide a bearing surface to support the door means 24. When the door means 24 is moved to close the outlet openings 22, the portions 27 engage in the notches 21A, and the shape of the portions match the configuration of the cowl so the openings can be closed against undesired leakage. When the door means 24 is moved to close the outlets 22 the inlet geometric contraction is greater than when the door means is moved fully aft to open outlet openings 22. The respective closed and open positions of the outlet openings 22 or cowl vents are shown in FIGS. 4 and 5.

Movement of the door means is obtained by motor means 30 positioned in the body 10 rearwardly of the cowl. The motor is connected by an actuator 31 to having its outer end attached to an anchor 32 on the rear edge of the door means 24. Either multiple motor means or single motor means using multiple linkages may be employed to actuate the door means so that skewing and binding thereof can be avoided.

The structure described above has disclosed a vented cowl air inlet having a variable geometry airflow passage as the result of the provision of door means having the vent controlling projecting elements 27 shaped to vary the cross-sectional area of the airflow passages 19 between the struts 18 and 20. The primary purpose for the construction thus provided is to enable starting of the inlet. The inlet of FIG. 4 is overly contracted in the throat section 28 and more air than is necessary tries to flow through. By opening the cowl vents 22 and discharging excess air overboard, the inlet can be started. Thereafter the cowl vents can be closed and the inlet will remain started.

After the inlet has started, the door means 24 can be positioned to open the cowl vents 22 more or less to match a preprogrammed regimen for the aircraft which can include reducing fuel consumption and coordinated dumping of air through the outlet vents without flame-out in the combustion chamber. Thus, the vented cowl construction has the unique ability to vary the inlet air capture and its contraction to achieve the degree of variability necessary for optimum or near optimum inlet performance for many aircraft and missile applications.

Tests on a typical ramjet missile, which had utilized a fixed geometry chin inlet, when provided with a two-position vented cowl inlet showed an increased mission performance of upwards of fifty percent. The use of an electric motor for the motor means 20 in FIGS. 4 and 5 can make the inlet fully variable and is slightly preferred, but for simplicity of disclosure the discrete positioning piston and cylinder type of motor means has been shown.

The foregoing vented cowl variable geometry inlet structure is suitable for use with supersonic aircraft engine air induction systems. It may also be used for high performance air induction systems associated with air driven auxiliary power equipment.

It should now appear from the foregoing disclosure of a present preferred embodiment that the particular novel features therein contribute to added performance given to an otherwise fixed geometry inlet for aircraft bodies by the movement of the door means relative to the outlet vents which permits starting overly contracted inlets, optimizes the airflow to the propulsion engine and inlet contraction (pressure recovery performance) and bleeds the cowl boundary layer overboard thereby reducing normal shock train pressure losses.

It should be appreciated from the foregoing disclosure that variations and/or modifications can be made without departing from the intent of the disclosure represented by the present preferred improvement.

What is claimed is:

1. In a vented cowl variable geometry air inlet structure for the body of an aircraft, the improvement comprising:
   (a) cowl means on the aircraft body in position to extend longitudinally along side the body and arranged therewith for defining an air flow passage having an air inlet presented to the airstream, said passage being formed with air escape vent means spaced from said inlet in the direction of airflow in said cowl means for venting air to the exterior of the passage;
   (b) door means carried by said cowl means for selective movement between a first position moved for closing said air escape vent means and a second position moved for opening said air escape vent means; and
   (c) said door means and said cowl means defining a contracted throat located downstream beyond the leading edge of said vent means, and said door means in said second position effecting a change in the geometry of the airflow passage whereby said inlet can be started for supersonic operation of the vented cowl inlet.

2. The improvement set forth in claim 1 wherein said cowl means includes strut means arranged in spaced relation for defining the sides of said airflow passage therebetween, and said vent means is disposed in a wall of said airflow passage between said strut means.

3. The improvement set forth in claim 1 wherein said cowl means is formed with a curved surface and is partially embracing the aircraft body; said vent means is located in said curved surface of said cowl means; and said door means has a curved configuration substantially matching said curved surface of said cowl means; said curved configuration of said door means in the moved position supplying the change in the geometry and contraction of the airflow passage necessary to start the inlet.

4. A vented cowl variable geometry air inlet construction for an aircraft body having onboard propulsion means comprising, in combination:
   (a) a cowl attached to the aircraft body in position to provide an airflow passage with an air inlet at one side of the body and opening in the direction of aircraft flight and a contracted throat section downstream from said air inlet, said cowl being formed with an opening through said cowl to the exterior from said airflow passage and the leading edge of said opening being located to the rear of said air inlet and in advance of said contracted throat section; and (b) door means mounted within said airflow passage and movable between positions closing said opening to the exterior from said passage and exposing said opening between said airflow passage and the exterior for the dumping of a portion of the air flowing in said airflow passage to the exterior in bypass of said contracted throat section, said door means having a leading edge portion positionable in abutment with said cowl in the closed position of said opening to the exterior and positionable in said airflow passage to open said cowl opening and simultaneouly vary the geometry and contracting of said airflow passage from the inlet opening through the throat section.

5. The air inlet construction set forth in claim 4 wherein strut means are positioned in spaced relation laterally of each other in said airflow passage to enclose the sides of and subdivide said passage, said cowl openings being formed in each subdivided passage between spaced strut means, and said door means having projecting elements between each pair of said strut means forming leading edge portions positionable selectively to open and close said cowl opening.

6. A vented cowl variable geometry air inlet construction for an aircraft body having onboard propulsion means comprising, in combination:
   (a) a cowl attached to the aircraft body in position to provide an airflow passage with an air inlet at one side of the body and opening in the direction of aircraft flight and a contracted throat section downstream from said air inlet, said cowl being formed with an opening through said cowl to the exterior from said airflow passage and the leading edge of said opening being located to the rear of said air inlet and in advance of said contracted throat section; and
   (b) door means mounted within said airflow passage and movable between positions closing said opening to the exterior from said passage and exposing said opening between said airflow passage and the exterior for the dumping of a portion of the air flowing in said airflow passage to the exterior in bypass of said contracted throat section, said door means having a leading edge portion positionable in abutment with said cowl in the closed position of said opening to the exterior and said door means being movable for effecting the modification of said airflow passage contraction by simultaneously varying the geometry of said airflow passage.

7. In a vented cowl variable geometry air inlet structure for the body of an aircraft with onboard propulsion means, the improvement comprising:
   (a) a cowl structure at one side of the aircraft body forming an air inlet for the propulsion means, said cowl structure defining with said body a contracted throat in airflow communication with said inlet;
   (b) strut means supporting said cowl structure in position to define airflow passages leading from said air inlet into said contracted throat section;
   (c) said cowl structure being formed with outlet opening means in advance of said contracted throat section for dumping air to the exterior of said airflow passages;
   (d) means in said cowl structure movable from a position closing said cowl outlet openings to a position in which said cowl outlet opening means is open for dumping air in advance of said throat section, said movable means having a portion movable in said airflow passage for varying the contraction of said airflow passage; and
   (e) motor means operably connected to said movable means in said cowl structure for moving the same between positions closing said cowl outlet openings and opening the same.

* * * * *